(12) United States Patent
Aaron

(10) Patent No.: US 8,649,798 B2
(45) Date of Patent: Feb. 11, 2014

(54) METHODS AND DEVICES FOR ATTRACTING GROUPS BASED UPON MOBILE COMMUNICATIONS DEVICE LOCATION

(75) Inventor: Jeffrey Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1731 days.

(21) Appl. No.: 11/627,260

(22) Filed: Jan. 25, 2007

(65) Prior Publication Data

US 2008/0182586 A1 Jul. 31, 2008

(51) Int. Cl.
*H04W 24/00* (2009.01)

(52) U.S. Cl.
USPC .............. 455/456.1; 455/404.2; 455/519; 455/459

(58) Field of Classification Search
USPC ............ 455/456.1–457, 404.2, 459, 518, 519
See application file for complete search history.

(56) References Cited

U.S. PATENT DOCUMENTS

| | | | |
|---|---|---|---|
| 4,853,628 A | 8/1989 | Gouldsberry et al. | |
| 5,505,057 A | 4/1996 | Sato et al. | |
| 5,812,932 A | 9/1998 | Wiedeman et al. | |
| 6,130,707 A | 10/2000 | Koller et al. | |
| 6,567,835 B1 | 5/2003 | Blomgren et al. | |
| 6,580,914 B1 | 6/2003 | Smith | |
| 6,587,835 B1 | 7/2003 | Treyz et al. | |
| 6,754,665 B1 | 6/2004 | Futagami et al. | |
| 6,853,628 B2 * | 2/2005 | Chitrapu | 370/328 |
| 6,892,217 B1 | 5/2005 | Hanmann et al. | |
| 6,912,398 B1 | 6/2005 | Domnity | |
| 6,947,976 B1 | 9/2005 | Devitt et al. | |
| 6,977,997 B2 | 12/2005 | Shioda et al. | |
| 7,046,987 B2 | 5/2006 | Siegel et al. | |
| 7,136,658 B2 | 11/2006 | Cole et al. | |
| 7,136,688 B2 | 11/2006 | Jung et al. | |
| 7,155,238 B2 | 12/2006 | Katz | |
| 7,324,959 B2 | 1/2008 | Malkin et al. | |
| 7,356,347 B1 | 4/2008 | Kammer | |
| 7,599,795 B1 | 10/2009 | Blumberg et al. | |
| 7,634,228 B2 | 12/2009 | White et al. | |
| 2002/0082931 A1 | 6/2002 | Siegel et al. | |
| 2002/0095333 A1 | 7/2002 | Jokinen et al. | |
| 2002/0101993 A1 | 8/2002 | Eskin | |
| 2002/0147928 A1 | 10/2002 | Mahajan et al. | |

(Continued)

OTHER PUBLICATIONS

U.S. Appl. No. 11/610,898, filed Dec. 14, 2006.

(Continued)

*Primary Examiner* — Vladimir Magloire
(74) *Attorney, Agent, or Firm* — Parks IP Law LLC; Jennifer P. Medlin, Esq.

(57) ABSTRACT

Individuals carrying a mobile communications device may send and/or receive attractor signals that specify where predefined groups are meeting at large gathering such as sporting events or concerts. The groups may be open to the public or may be private. The attractor signals are sent to those mobile communications devices of the group that are currently present at the event location rather than to all potential members of the group. The attractors may present information regarding where the meeting point is, who initiated the attractor signal, which individuals have responded to the attractor or are already at the meeting point, and so forth. The attractors maybe updated to with more current information including new guidance data as the user receiving the attractor changes location in an attempt to find the meeting point.

21 Claims, 7 Drawing Sheets

| 400 | 402 GROUP ID | 404 GROUP MEMBERS | 406 LOCATION |
|---|---|---|---|
| 408 | 1234 | 123-456-7890 | X1 LAT Y1 LONG; 0.25 MILE RADIUS |
| | | 123-456-7891 | |
| | | 123-456-7892 | |
| 410 | 5678 | 123-456-1234 | X1 LAT, Y1 LONG; |
| | | 123-456-2345 | X2 LAT, Y2 LONG; |
| | | | X3 LAT, Y3 LONG; |
| | | 123-456-7890 | X4 LAT, Y4 LONG; |
| 412 | 9876 | 123-123-4567 | X5 LAT Y5 LONG; 0.5 MILE RADIUS |
| | | 123-234-7890 | |
| | | 123-456-7891 | |

(56) References Cited

U.S. PATENT DOCUMENTS

| | | | |
|---|---|---|---|
| 2002/0178385 A1 | 11/2002 | Dent et al. | |
| 2003/0006913 A1 | 1/2003 | Joyce | |
| 2003/0008661 A1 | 1/2003 | Joyce | |
| 2003/0050039 A1 | 3/2003 | Baba et al. | |
| 2003/0198204 A1 | 10/2003 | Taneja et al. | |
| 2004/0032503 A1 | 2/2004 | Monden et al. | |
| 2004/0082351 A1* | 4/2004 | Westman | 455/518 |
| 2004/0092269 A1 | 5/2004 | Kivinen | |
| 2004/0110515 A1 | 6/2004 | Blumberg et al. | |
| 2004/0141606 A1 | 7/2004 | Torvinen | |
| 2004/0209602 A1 | 10/2004 | Joyce | |
| 2005/0073406 A1 | 4/2005 | Easley et al. | |
| 2005/0075116 A1 | 4/2005 | Laird et al. | |
| 2005/0113123 A1* | 5/2005 | Torvinen | 455/518 |
| 2005/0117516 A1 | 6/2005 | Yang | |
| 2005/0149443 A1 | 7/2005 | Torvinen | |
| 2005/0153729 A1 | 7/2005 | Logan et al. | |
| 2005/0176420 A1 | 8/2005 | Graves et al. | |
| 2005/0181824 A1 | 8/2005 | Lloyd | |
| 2005/0215238 A1 | 9/2005 | Macaluso | |
| 2005/0221876 A1 | 10/2005 | Van Bosch et al. | |
| 2005/0248456 A1 | 11/2005 | Britton et al. | |
| 2005/0266870 A1* | 12/2005 | Benco et al. | 455/519 |
| 2005/0288038 A1 | 12/2005 | Kim | |
| 2006/0009240 A1 | 1/2006 | Katz | |
| 2006/0015404 A1 | 1/2006 | Tran | |
| 2006/0033625 A1 | 2/2006 | Johnson et al. | |
| 2006/0047573 A1 | 3/2006 | Mitchell et al. | |
| 2006/0089158 A1 | 4/2006 | Lai et al. | |
| 2006/0095540 A1 | 5/2006 | Anderson et al. | |
| 2006/0178932 A1 | 8/2006 | Lang | |
| 2006/0194595 A1 | 8/2006 | Myllynen et al. | |
| 2006/0224863 A1 | 10/2006 | Lovett et al. | |
| 2006/0253453 A1 | 11/2006 | Chmaytelli et al. | |
| 2007/0004393 A1 | 1/2007 | Forsberg et al. | |
| 2007/0037561 A1 | 2/2007 | Bowen et al. | |
| 2007/0037605 A1 | 2/2007 | Logan | |
| 2007/0054687 A1* | 3/2007 | Akita et al. | 455/518 |
| 2007/0136796 A1 | 6/2007 | Sanchez et al. | |
| 2007/0182818 A1 | 8/2007 | Buehler | |
| 2007/0232342 A1* | 10/2007 | Larocca | 455/518 |
| 2007/0287379 A1 | 12/2007 | Matsuura et al. | |
| 2008/0004951 A1 | 1/2008 | Huang et al. | |
| 2008/0032677 A1 | 2/2008 | Catovic et al. | |
| 2008/0045236 A1 | 2/2008 | Nahon et al. | |
| 2008/0052169 A1 | 2/2008 | O'Shea et al. | |
| 2008/0114778 A1 | 5/2008 | Siegel | |
| 2008/0169921 A1 | 7/2008 | Peeters | |
| 2008/0182563 A1 | 7/2008 | Wugofski et al. | |
| 2008/0182586 A1 | 7/2008 | Aaron | |
| 2008/0215145 A1 | 9/2008 | Willims | |
| 2008/0268895 A1 | 10/2008 | Foxenland | |
| 2009/0176524 A1* | 7/2009 | David | 455/518 |
| 2009/0292920 A1 | 11/2009 | Willey | |

OTHER PUBLICATIONS

U.S. Appl. No. 11/611,345, filed Dec. 15, 2006.
U.S. Appl. No. 11/610,890, filed Dec. 14, 2006.
U.S. Appl. No. 11/611,434, filed Dec. 15, 2006.
U.S. Appl. No. 11/610,927, filed Dec. 14, 2006.
U.S. Appl. No. 11/611,475, filed Dec. 15, 2006.
U.S. Appl. No. 11/611,517, filed Dec. 15, 2006.
U.S. Appl. No. 11/668,803, filed Jan. 30, 2007.
U.S. Appl. No. 11/668,848, filed Jan. 30, 2007.
U.S. Appl. No. 11/627,269, filed Jan. 25, 2007.
Helio GPS-powered Buddy Beacon, http://www.helio.com, date unknown, believed to exist before filing of the present application.
GPS Locator Phone, http://www.wherify.com/wherifone/kids.html?page-kids, copyright 2006, believed to exist before filing of the present application.
Dodgeball.com bringing your phone to life. http://www.dodgeball.com, copyright 2006, believed to exist before filing of the present application.
OnStar Technology, http://www.onstar.com/US_english/jsp/explore/onstar_basics/technology.jsp, copyright 2006, believed to exist before filing of the present application.
U.S. Appl. No. 11/843,954, filed Aug. 23, 2007.
Huang "Adaptive Zone Routing Protocol for Bluetooth Scatternets", pp. 1-16 (Aug. 26, 2004).
Woodings "Rapid Heterogeneous ad hoc connection establishment. Accelerating Bluetooth inquiry using IrDA", Wireless Comm & Networks Conf (2002) abstract only.
Leopold et al. "Bluetooth and Sensor Networks: A Reality Check", SenSys (Nov. 2003).
Palo Wireless "K1-Generic Access Profile", http://www.palowireless.com/infotooth/tutorial1_gap.asp (2004).
Huang et al. "A Self-Adaptive Zone Routing Protocol for Bluetooth Scatternets", Computer Communications; v28:1:37-50 (Jan. 2005).
Woodings et al. "Rapid Heterogeneous Connection Establishment: Accelerating Bluetooth Inquiry Using IrDA", Wireless Communications and Networking Conference (2002).
Aalto et al. "Bluetooth and WAP Push Based Location-Aware Mobile Advertising System", MobiSys (2004).

* cited by examiner

| GROUP ID | GROUP MEMBERS | LOCATION |
|---|---|---|
| 1234 | 123-456-7890<br><br>123-456-7891<br><br>123-456-7892 | X1 LAT Y1 LONG; 0.25 MILE RADIUS |
| 5678 | 123-456-1234<br><br>123-456-2345<br><br>123-456-7890 | X1 LAT, Y1 LONG;<br>X2 LAT, Y2 LONG;<br>X3 LAT, Y3 LONG;<br>X4 LAT, Y4 LONG; |
| 9876 | 123-123-4567<br><br>123-234-7890<br><br>123-456-7891 | X5 LAT Y5 LONG; 0.5 MILE RADIUS |

FIG. 4

METHODS AND DEVICES FOR ATTRACTING GROUPS BASED UPON MOBILE COMMUNICATIONS DEVICE LOCATION

TECHNICAL FIELD

Embodiments are related to mobile communications devices. More particularly, the embodiments are related to the attraction of groups of people to a common location based upon mobile communications device locations.

BACKGROUND

People often find themselves at large gatherings such as at sporting events, at political events, at concerts, at airports, at conventions, at national parks, and so on. In most of these instances, individuals may have friends, family, colleagues, co-workers, or other acquaintances that are also in the large gathering. They may be unaware of those others who are also at the gathering, and identifying those others who are also at the gathering may be difficult and/or inconvenient. Furthermore, due to the size of the event or location, those individuals may not cross paths and may not have an opportunity to congregate while there.

Mobile communications devices such as cellular phones, PDAs, and the like have become a ubiquitous part of daily life, and many people carry them to such large gatherings. The mobile communications device can thereby assist individuals at a large gathering in finding those who are known to be there or those who could possibly be there by allowing one individual to place a call to the others of interest.

While the mobile communications device can assist, this manner of contacting the other potential attendees is an inefficient and burdensome process. The caller must be able to think of those that might be in attendance in order to call them, or must utilize a list of people that may or may not coincide with the gathering but likely was formed for another purpose entirely. Additionally, the caller must take the time to call or message each one, which may require significant time and effort and may interfere with the caller's enjoyment of the large gathering. Furthermore, those being called must actually answer the call in order to learn of the caller being in attendance and wishing to congregate. Perhaps the greatest drawback is that those who are not in attendance, and of course have no interest in congregating at the large gathering because they are not present there, may get a call or message from the caller solely for the purpose of asking them to find the caller at the event. If they are not at the event, and so cannot possibly find the caller there, then they have been bothered for no reason.

SUMMARY

Embodiments address these issues and others by providing attractors that can be initiated from one user of a mobile communications device who belongs to a group and be addressed to the group or a sub-set thereof. An attractor may be thought of as a location-specific/location-limited invitation and/or message The attractor may specify information such as who is sending it, where that person is located and/or where the gathering of the group should occur, instructions for finding that person, and so on. The attractors are delivered to others if those others also have mobile communications devices and are also in attendance at the large gathering. Those others may then review the attractor and decide whether to join the gathering of the group, ignore the attractor, and/or send out their own attractor for the group to create another group gathering.

Embodiments provide a method of attracting individuals together that involves receiving a signal from a first mobile communications device that is indicative of a current location of the first mobile communications device. The method further involves finding an attractor of at least one group defined for the current location of the mobile communications device and sending the at least one attractor to the first mobile communications device Embodiments provide a computer readable medium containing instructions that perform acts that include receiving a signal at a mobile communications device that specifies a list of groups defined for a current location of the mobile communications device. The acts further include receiving at the mobile communications device a selection from the list of groups and sending a signal specifying the selected group. Additionally, the acts involve in response to sending the signal that specifies the selected group, receiving at the mobile communications at least one attractor for the selected group.

Embodiments provide a mobile communications device that includes a transceiver that communicates with a mobile communications network, a location device, a user input device, and an output device. The mobile communications device further includes a processor that sends and receives signals via the transceiver, the signals including attractors for groups to which the mobile communications device is associated and including location signals indicative of the location of the mobile communications device based on an output of the location device. The processor further provides information including information of received attractors for the current location of the mobile communications device to a user via the output device and receives information including requests by the user to send attractors to groups of the current location of the mobile communications.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

FIG. 4 shows a data table maintained by a group list server to organize groups by location.

DETAILED DESCRIPTION

Embodiments provide for mobile communications devices to assist in the gathering of groups of individuals together at events. A user of a mobile communications device may wish to gather together individuals that are associated with a particular group, such as a family unit, a division of a business, fans of a particular person performing at the event, and so forth. The user may initiate an attractor for the group. Those other individuals of the group may wish to check and see if an attractor is present for any of the groups to which they belong and upon finding the attractor that has been sent, may follow the instructions of the attractor to locate the group of interest.

Figure 1:
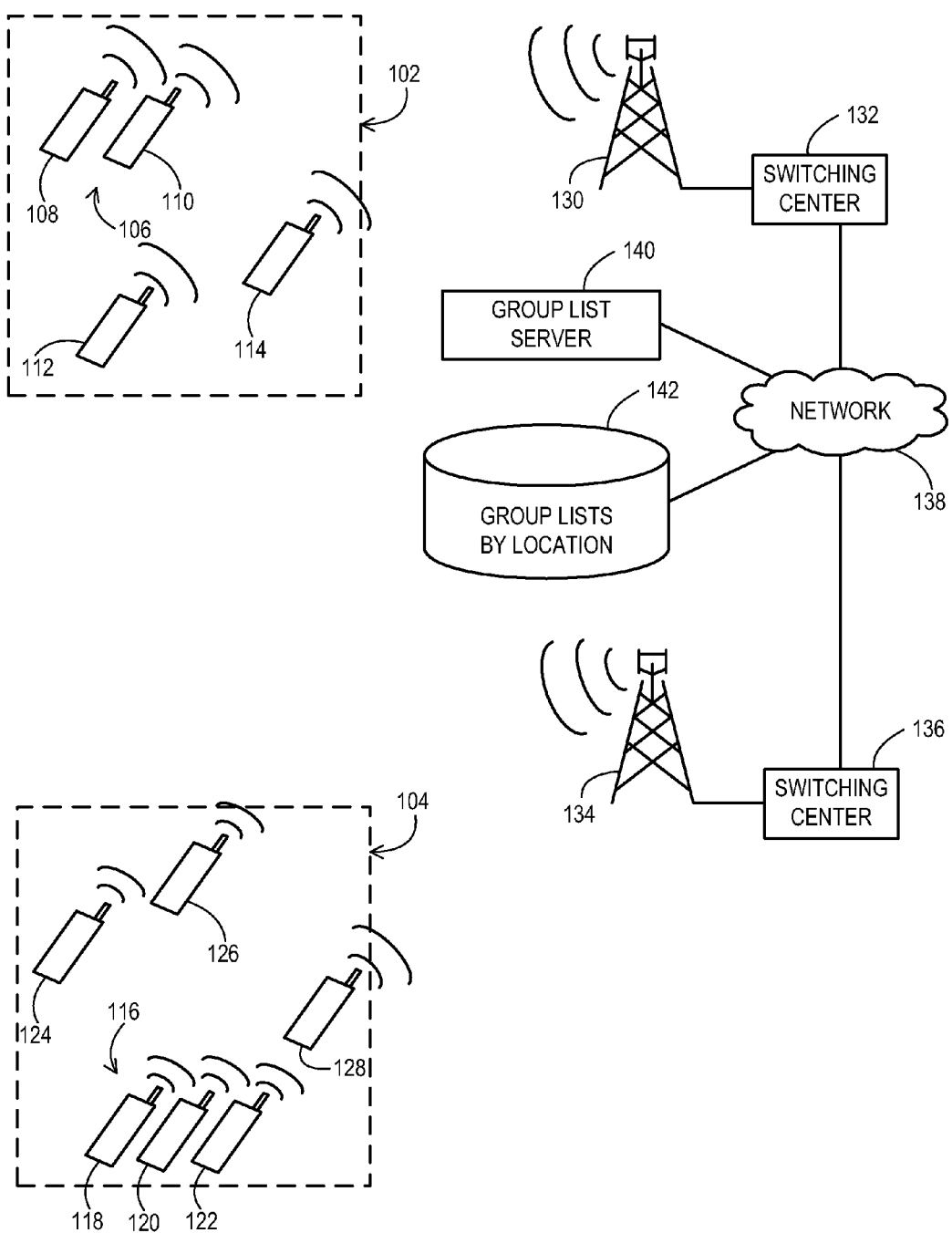
FIG. 1 shows events where users of mobile communications devices are present and are grouping together by following attractors triggered by one of the mobile communications devices.

FIG. 1 shows a couple of event locations 102 and 104. At a first event location 102, a group 106 has formed at a point where a user of a mobile communications device 108 and another user of a mobile communications device 110 have gathered. Other interested members including users of mobile communications devices 112 and 114 may wish to find a group of interest. However, the existence and/or location of the group 106 are not readily apparent to the users of the mobile communications devices 112 and 114 who would otherwise be interested in meeting with the group 106.

Similarly, at a second event location 104, a group 116 including users of mobile communications devices 118, 120, and 122 has gathered at a particular point at the event location 104. Users of mobile communications devices 124, 126, and 128 may wish to find a group of interest but may not be aware of the existence and/or location of the group 116 that would otherwise be of interest to them.

Fortunately, the event locations 102, 104 may be served by a mobile communications network such as a cellular network, a WiMax network, or even a shorter range network such as a Wi-Fi network. The mobile communications network may include one or more base stations 130, 134 in conjunction with one or more switching centers 132, 136. As shown, the event location 102 is served by the base station 130 and switching center 132 while the event location 104 is served by the base station 134 and switching center 136.

The switching centers 132, 136 are interfaced to a network 138 such as a public or private network. For example, the network 138 may be a private intranet that is local to the event location 102 or 104. As another example, the network 138 may be a public network such as the Internet. According to various embodiments, the switching centers 132, 136, and hence the mobile communications devices 106-128, are able to communicate over the network 138 to a group list server 140. The group list server 140 may provide a group attractor service whereby one or more subscribers to a group may initiate attractors, and the group list server 140 may then provide those attractors to other subscribers of the group who are present at the event location 102 or 104.

The group list server 140 may provide the group attractor service by maintaining a database 142. The database 142 may store associations of group identifiers to group member identifiers. Furthermore, one or more locations may be associated with each of the group identifiers and with each of the group member identifiers. By the group list server 140 obtaining the location of the mobile communications devices 106-128 from the switching centers 132, 136 which receive the location from the mobile communications devices, the group list server 140 remains aware of which mobile communications devices are present at which of the event locations 102, 104. Accordingly, when a user of one of the mobile communications devices 106-128 at the event location 102, 104 chooses to send an attractor, the group list server 140 is already aware of which other mobile communications devices are also present and can notify those devices of the attractor.

The notification of the attractor to the mobile communications devices 106-128 may be pushed from the group list server 140 or may be requested by the mobile communications devices. Furthermore, the attractor may be open to all attendees of an event, to all subscribers to a private group, or even to a subset of the subscribers. The group list server 140 may maintain such subscriber information in order to determine which of the mobile communications devices 106-128 should receive the private or semi-private attractor. Note that an "event location" as used herein is illustrative and is not meant to be limiting. An "event location" does not necessarily have to be associated with a traditional event or a current event, but may be a location that can potentially be associated with an event or is periodically associated with an event, and moreover in the broadest sense can include any location or area as may be desired.

In addition to or as an alternative to the group list server 140 acting as an intermediary between the mobile communications devices 106-128, the mobile communications devices themselves may use peer-to-peer communications to also generate proximity based attractor signals. For example, a mobile communications device may be equipped with a short range peer-to-peer transceiver such as a Wi-Fi transceiver or a Bluetooth® transceiver. The attractor signal may be broadcast from that mobile communications device, and other mobile communications devices that come into range of that proximity based signal may receive the attractor for the group. This peer-to-peer approach may limit the reach of the attractor signal relative to the approach that utilizes the mobile communications network and group list server 140, but may be effective where unsuspecting group members are likely to pass nearby the meeting point.

Figure 2:
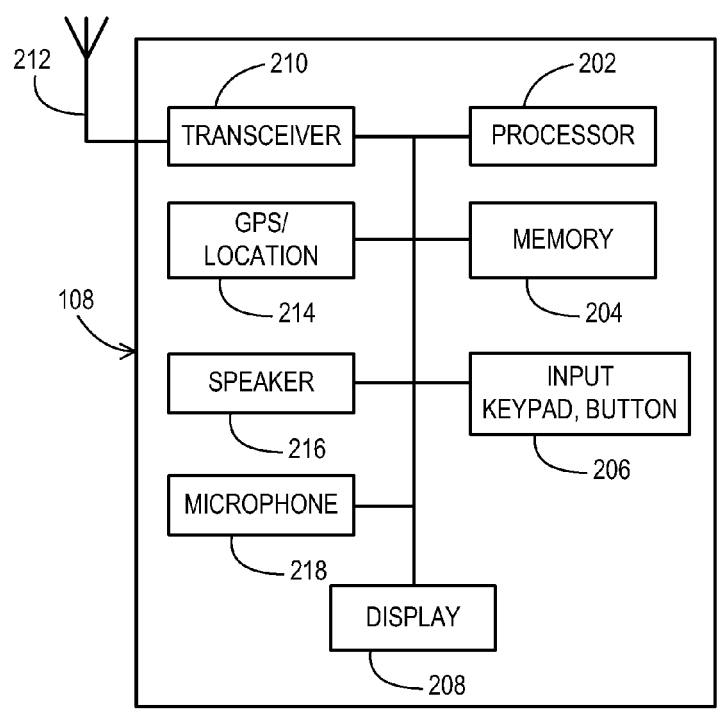
FIG. 2 shows one example of a mobile communications device.

FIG. 2 shows the components of one example of the mobile communications device 108 for receiving notification of an attractor and/or generating attractor signals. According to exemplary embodiments, the mobile communications device 108 includes a processor 202, a memory 204, input device(s) such as keypads or input buttons 206 or microphones 218, and output device(s) such as a display device 208 or other output such as an audio speaker 216. The mobile communications device 108 also includes a transceiver 210 with an antenna 212 for communicating with a wireless endpoint such as a cellular base station and/or directly via peer-to-peer communications with other mobile communications devices. Additionally, the mobile communications device 108 may include a location device 214, such as a geonavigational positioning system (GPS) receiver, a cellular signal triangulation receiver, and the like which detects the physical location of the mobile communications device 108 at virtually all times.

The processor 202 performs actions based on instructions either hard coded into the processor 202 or stored in the memory 204. An example of the logical operations performed is discussed below in relation to FIG. 6. The processor 202 may be a dedicated/special purpose processor or a general purpose programmable processor or some combination. The memory 204 may be volatile memory, non-volatile memory, or a combination thereof. The processor 202 and/or memory 204 are examples of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The input devices 206 may include a keypad, keyboard, touchscreen, and so forth. Likewise, the microphone 218 may serve as an input device where voice recognition is implemented by the processor 202 to convert voice input to computerized commands. The input device 206 or microphone

218 provides data to the processor 202 which acts upon the input to perform requested tasks. The input device 206 or microphone 218 may be used to initiate an attractor and/or to respond to a received attractor.

The output devices may include the display screen 208 and/or audio output via the speaker 216. The display screen 208 may provide a visual interface allowing the user to make selections regarding initiating the attractor or responding to an incoming attractor. Furthermore, either or both of the display screen 208 and speaker 216 may output attractor information such as guidance information to assist the user of the mobile communications device 108 in finding the meeting point for the group.

Figure 3:
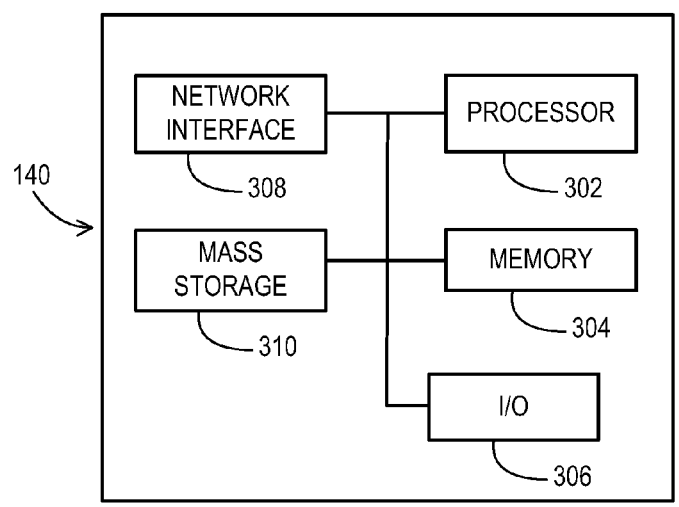
FIG. 3 shows one example of a group list server.

FIG. 3 shows components of an example of the group list server 140. The group list server 140 may include the standard components of a server computer including a processor 302, memory 304, input/output devices 306, mass storage 310, and a network interface 308. The processor 302 communicates with external devices including mobile communications devices, such as the mobile communications device 108, via the network interface 308. The processor 302 determines which devices should receive an attractor. Additionally, the processor 302 may determine guidance information to include in the attractor being sent to the appropriate devices by comparing the appropriate devices' current locations to the location of the mobile communications device that initiated the attractor for the group. Examples of the logical operations performed by the processor are discussed below in relation to FIG. 7.

The memory 304 may be volatile or non-volatile or a combination thereof and may store instructions to be performed by the processor 302 when providing the group attractor service. As discussed above in relation to the mobile communications device 108, the processor 302 and the memory 304 are examples of computer readable media.

The input/output 306 may be used for local operation and management of the group list server 140. The input/output 306 may include a keyboard, mouse, display, and the like.

The mass storage device 310 may contain applications such as an operating system and a group attractor service application. Thus, the processor 302 may access the storage device 310 when implementing the group attractor service. The mass storage device 310 is another example of a computer readable medium.

The database 142 of FIG. 1 may be contained within the mass storage device 310. As an alternative, the database 142 may be present as network storage, accessible via the network interface 308.

FIG. 4 illustrates a data table 400 that may be stored by the database 142 and accessed by the group list server 140. According to exemplary embodiments, a first column 402 stores the identifiers of each of the groups for which the attractor service is being provided. A column 404 stores the mobile communications device identifiers of each of the group members. A column 406 stores the description of the locations for which the groups may gather and where the attractors may be sent and received.

The example shown includes three groups in three rows 408, 410, and 412 for purposes of illustration. Group 1234 of the row 408 includes three group member mobile communications devices in the column 404 for purposes of illustration. The identification of the column 404 may be of various forms such as an electronic serial number or phone number of the mobile communications device or any other combination of numbers, letters, and/or characters that uniquely identify the mobile communications device. As set forth in the row 408, column 406, the event location that is established for group 1234 is defined by a particular geographical point, X1 latitude and Y1 longitude, with a specified radius of 0.25 miles from that point to thereby form a circular area. Accordingly, when any one of the three devices associated with group 1234 becomes located at this location, that device is eligible to send and receive attractors for group 1234.

Group 5678 of the row 410 also includes three group member mobile communications devices in the column 404 for purposes of illustration. As set forth in the row 410, column 406, the event location that is established for group 5678 is specified by four geographical points to thereby form a rectangular area. Accordingly, when any one of the three devices associated with group 5678 becomes located at the location, that device is eligible to send and receive attractors for group 5678.

Group 9876 of the row 412 also includes three group member mobile communications devices in the column 404 for purposes of illustration. As set forth in the row 412, column 406, the event location is defined as a circular area of a given radius from a specific geographical point. When any one of the three mobile communications devices associated with group 9876 becomes located at the defined location, then that device is eligible to send and receive attractors for group 9876.

A single device may be a member of many different groups, for the same and for different event locations. Furthermore, there may be many different groups for the same or for overlapping event locations. As shown, the mobile communications device corresponding to the identifier 123-456-7890 is a member of group 1234 and a member of group 5678. The event location defined for group 1234 at least partially overlaps with the event location defined for group 5678. Thus, when the device corresponding to the identifier 123-456-7890 is located within the overlapping portion, that device is then eligible to send and receive attractors for both groups at the same time. As is also shown, the mobile communications device 123-456-7891 is a member of group 1234 as well as group 9876. According to exemplary embodiments, where X5 latitude and Y5 longitude does not fall within the circular event location defined for group 1234 nor within the rectangular event location defined for group 5678, then this device will be eligible to send and receive the attractor only for one event location or the other, for whichever the device is actually present.

While the groups of the table 400 have defined group members, the groups may either be closed to the public or be open. When closed to the public, then only the defined group members that are present at the defined event location may send and receive attractors for the group. However, for groups that are open to the public, then the public that is present at the event location may be provided with an attractor that has been generated by one of the group members also at the event location. Thus, for groups that are set to be open to the public, non-members may desire to meet with the group upon choosing to receive the attractor. They may subsequently wish to subscribe to the group so that they may initiate attractors as well. Furthermore, even for private groups, non-members who become aware of the group may wish to subscribe to the private group so that they may send and receive attractors for it.

Figure 5:
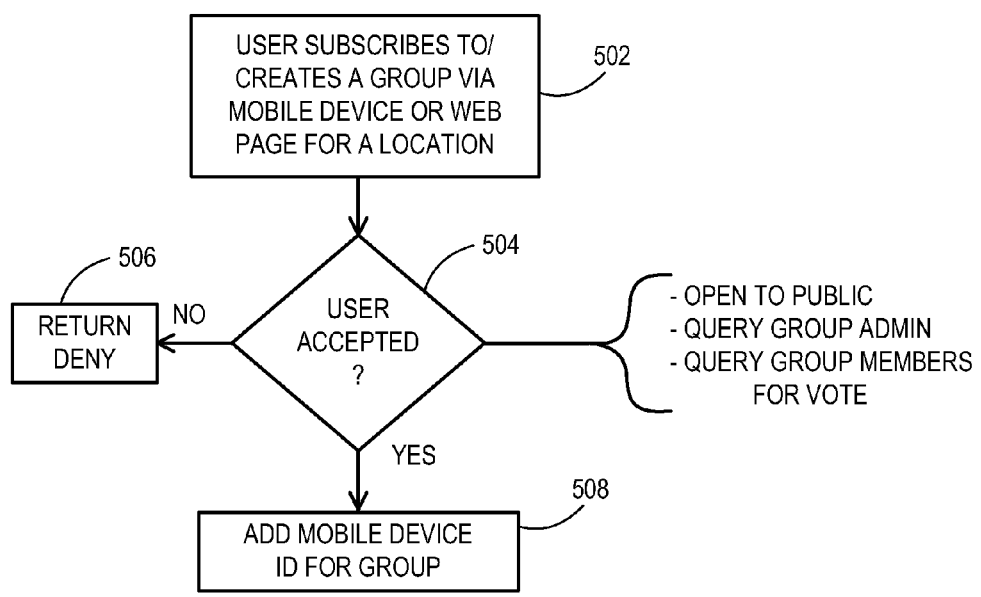
FIG. 5 shows an example of logical operations for subscribing to a group for an event location.

FIG. 5 shows a set of logical operations that may be performed by the group list server 140 in order to allow non-members to subscribe to an existing group or to even create a new group for an event location. The logical operations of FIG. 5 occur with the group list server 140 acting in conjunction with mobile communications devices, such as the mobile communications devices 106-128, or other computing devices capable of communicating with the group list server 140. For example, a user may utilize a home computer to browse to a web page for the group list server 140 in advance of attending the event. Alternatively, the user may utilize the mobile communications device 108 to do so if properly equipped for such browsing. The user might even attempt to subscribe to a group or create a new group via the mobile communications device 108 while present at the event location of interest. These operations allow a user to request a subscription to an existing group, whether public or private, and to create a new group or sub-group for a particular event location.

The user wishing to subscribe or create a new group connects to the group list server 140 via a menu selection of a mobile communications device, such as the mobile communications device 108, configured with the network address of the group list server or by using a web browser to browse to a web site posted by the group list server 140. The user then selects an option to subscribe to an existing group or create a new group at group operation 502. The group list server 140 then determines whether the user request for a subscription or for a new group is accepted at query operation 504.

To determine whether the user request to create a new group for a particular event location is accepted, the group list server 140 may consult rules that dictate whether new groups are possible for that event location. For example, the group list server 140 may consult a set of rules specified for the event location where those rules may limit the total number of groups to be created. Those rules may limit the total number of groups to which a particular mobile communications device may subscribe to determine whether the user attempting to create a new group of which he or she would automatically be a member would exceed the limit. Furthermore, the group list server 140 may apply rules to determine if there is anything objectionable about the group, such as a requested group name that is not appropriate.

Where the request is to add a new location for an existing group, the group list server 140 may consult rules for the group. These rules may assist the group list server 140 in determining whether there is a limit on the number of locations for the group, whether there is a limit on which event locations are allowable for the group, and so forth.

To determine whether the user request to subscribe to an existing group is acceptable, the group list server 140 may again consult rules for the group. If the request is to join the group for all event locations defined for the group, then general admission rules for the group may be applied. If the request is to join the group but only for specific event locations, then admission rules for the specific locations may be consulted in addition to or as an alternative to the general admission rules.

In order to subscribe to an existing group, either for all event locations or for particular ones, the group may employ a vetting process. The vetting process may be to allow all requesters, such as for public groups, or may require administrator or group approval. To obtain administrator approval, the mobile communications device of the administrator of the group may be flagged so that the group list server 140 submits a query to that mobile communications device, such as by a text message, email, voicemail, and the like and then receives a response. To obtain group approval, the group list server 140 may submit a query to all of the pertinent mobile communications devices. For example, a sub-group may be formed to vote on the admission of new members or the entire group may be requested to vote. In either case, the group list server 140 submits the query to the mobile communications devices again by text message, email, voicemail and the like and then receives the responses.

The group list server 140, upon receiving all the responses that are required for the vetting process of the particular group, then tallies the responses and compares to a set threshold for the group. For example, one group may require that all members must vote in the affirmative, where a non-vote may either be ignored or may be considered a "no." response. As another example, a group may require a lesser percentage than all to vote "yes" responses for admission.

Upon determining whether the user request is accepted, then either a denial is returned to the requesting party at deny operation 506 or the mobile communications device 108 of the request is added to the data table for the group, whether a new group or an existing group, at list operation 508. In both the deny operation 506 and the list operation 508, the requesting party may be notified of the result such as by a message to the device 108 used to generate the request at group operation 502 or any other communications device associated with the user.

Figure 6:
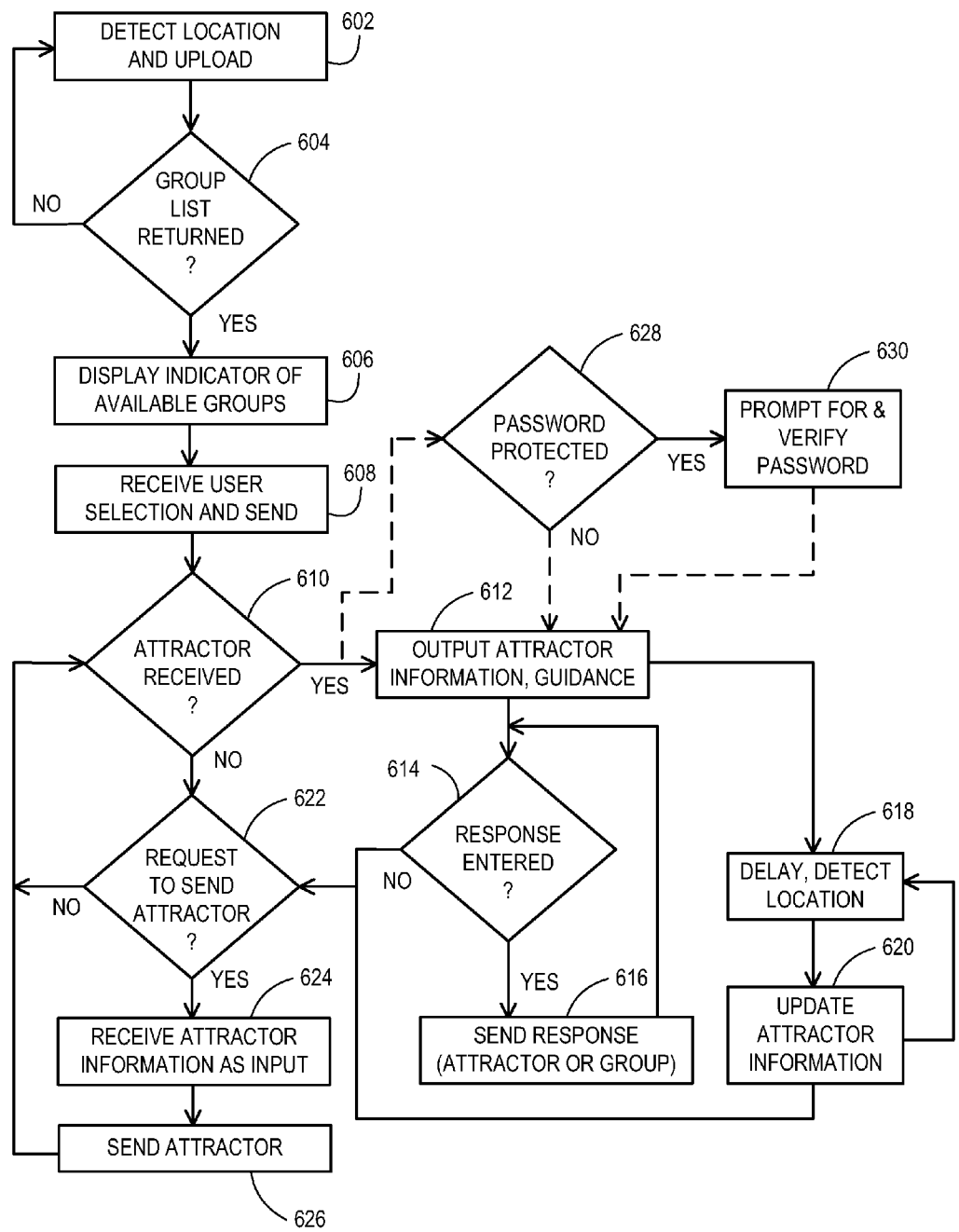
FIG. 6 shows an example of logical operations of a mobile communications device for receiving and/or sending an attractor for a group at an event location.

FIG. 6 shows an example of logical operations of the mobile communications device 108 to send and/or receive attractors for a given event location. Initially, the location of the mobile communications device 108 is determined and uploaded to the mobile communications network, and hence the group list server 140, at location operation 602. At query operation 604, the device 108 detects whether a group list has been returned to it for the current location that has been uploaded. If not, then the location is updated and uploaded after a short delay period. The group list may not be returned either because the mobile communications device 108 is not at an event location or because all groups defined for the current event location exclude the user.

If a group list is returned, then the device 108 displays the indicator of available groups for the current location at display operation 606. The device 108 then receives a selection by the user and sends that selection to the group list server 140 at selection operation 608. At query operation 610, the device 108 then detects whether one or more attractors have been received as a result of uploading the group selection. If not, then operational flow may proceed directly to query operation 622 regarding sending of an attractor which is discussed below. If at least one attractor is received, then operational flow proceeds to output operation 612, or query operation 628 for embodiments where passwords are being used. An attractor may not be received because no other members of the selected group have initiated one.

As an alternative approach, the display operation 606 may display the list of groups along with an indication of whether an attractor is active for each one. In that case, the user wishing to receive an attractor may select only those where an attractor is active. The user wishing to send an attractor may select from any of the available groups.

Returning to the approach shown in FIG. 6, at output operation 612, the device 108 outputs the attractor that has been initiated by someone else's mobile communications device to the user of device 108 by visually displaying it or audibly reproducing it. However, it may be desirable that an attractor is revealed to a user of the mobile communications device only upon entry of the proper password for the group. In that case, prior to output operation 612, the device 108 detects at query operation 628 whether the attractor is password protected and if so, then prompts the user to enter the password at input operation 630. Upon entry of the password by the user, the device 108 may then verify the input to the password encoded with the attractor that has been received. Upon verification, then output operation 612 provides the attractor information to the user.

There may be several reasons to include a password for an attractor. Especially for private groups not open to the public, it may be desirable to prevent the possessor of a mobile communications device associated with the group from receiving the attractor unless that possessor is the true owner of the mobile communications device. For example, the true owner may lend the mobile communications device to another or the mobile communications device may be stolen. In either case, the possessor may not be an intended recipient of the attractor and the password protection prevents the possessor from getting the attractor. Note that various protection methods other than passwords are well-known in the security art and may alternately or additionally be used, including certificates, authentication tokens, biometrics, etc.

At output operation 612, the attractor that is provided to the user may provide varying amounts of information and in various forms. For example, the attractor may be a text-based message or an audible message, spoken by either a machine generated voice or by the voice of the user who initiated the attractor. The attractor may indicate the name of the group and a meeting point that has been established. The meeting point may be described in relation to an indexing scheme of the event location, such as section number and row, a nearby landmark, or may be specified in terms of an absolute geographic location such as by latitude and longitude.

The attractor may provide a richer set of data as well. For example, the attractor may provide guidance to the user based on the current location of the user to assist the user in locating the meeting point, such as by indicating the general direction to travel or specific steps to take to find the meeting point. The attractor may also list the name of the user that initiated the attractor, the name of any group members that have responded, and other group related information. Thus, where there are multiple attractors in place for the same group, the user may view each one to determine which group is more desirable based on those attending each one.

Upon outputting the attractor, the device 108 then detects whether user input has been received to respond to the received attractor(s) at query operation 614. If not then operational flow transitions to query operation 622 regarding whether the user has selected to send an attractor for the selected group, which is further discussed below. However, when a user of the device 108 has entered a response to a received attractor, then the device 108 sends the response to the group list server 140 where it can be distributed to the initiator or others of the group at send operation 616.

In this example of FIG. 6, a parallel set of operations may also be performed upon the device 108 having outputted the attractor. Upon a delay, the device 108 may update its location and upload it to the mobile communications network and hence the group list server 140 at location operation 618. Upon doing so, the device 108 then receives updated attractor information that can be outputted as an update to the user at output operation 620. For example, the guidance data of the attractor may be updated based on the new position of the user of the device 108 and/or based on a new position of the meeting point if it has changed since the attractor was first received. This process of delaying, updating the location, and outputting an updated attractor may continue until the user manually terminates it or until the user reaches the meeting point.

Additionally, after updating the attractor, the device 108 may continually check to see if a request to send an attractor has been received from the user of the device 108 at query operation 622. If query operation 622 finds that no request has been received to send an attractor, this leg of the operational flow may return to query operation 610 where the device continues to listen for new incoming attractors for the selected group or groups.

Once the user of the device 108 does request to send an attractor, such as by making a menu selection on a user interface of the device 108, the device 108 then receives attractor information as input from the user at input operation 624. The attractor information inputted by the user may be information that is useful in guiding other group members, such as a seating section and row number or a nearby landmark. The attractor information inputted by the user may be other information relevant to the group, such as who is currently located at the meeting point in addition to the initiator, whether the meeting point will eventually be moved, and so forth. After the attractor information has been received, the device 108 then sends the attractor to the group list server 140 at send operation 626.

As previously discussed, the attractors may also be sent via short-range communications so that those other mobile communications devices that are in close proximity may receive the attractor and may act upon it as if it were being sent by the group list server 140. Accordingly, the sending of the attractor at send operation 626 may include sending this short-range broadcast of the attractor.

Figure 7:
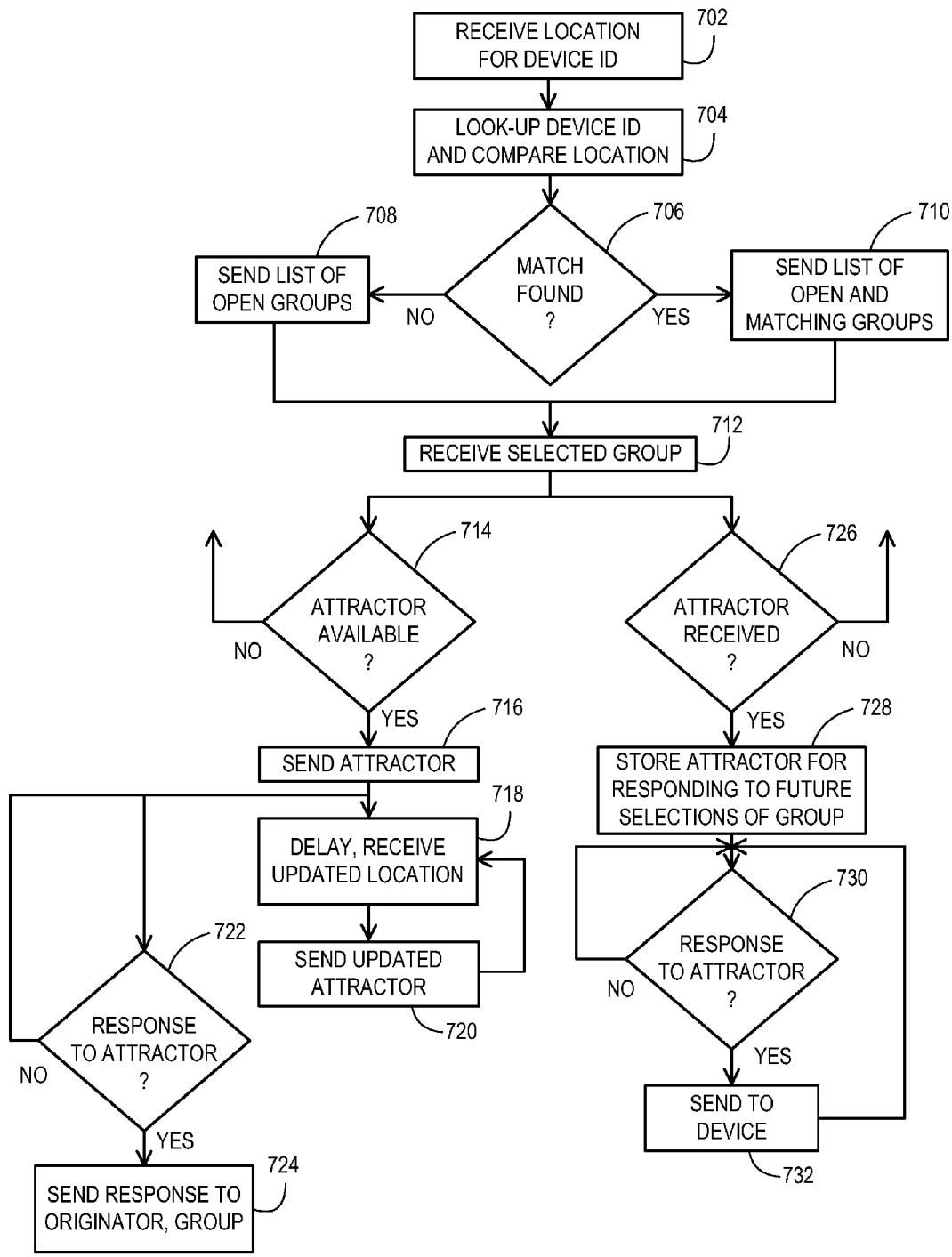
FIG. 7 shows an example of logical operations of a group list server for providing group information to mobile communications devices including receiving and forwarding attractors for the group.

FIG. 7 shows an example of logical operations performed by the group list server 140. These logical operations are performed when interacting with mobile communications devices in order to distribute attractors to the appropriate devices of the various groups for which group attractor service is being provided. Initially, the server 140 receives current location information associated with a particular mobile communications device identifier associated with a mobile communications device, such as the device 108, at location operation 702. The server 140 then looks-up the device identifier in the data table 400 to compare the received location with the specified event location at look-up operation 704.

The server 140 makes a determination regarding whether the received location and at least one of the specified event locations associated with the group that includes the device 108 match at query operation 706. It is presumed here that the current location of the device 108 is a match to an event location where the mobile device 108 may or may not be a member of a group for that location. Should the received location not match any of the specified event locations, then the server 140 does not respond since there are no groups to include in the response.

However, upon finding a matching location but no matching device ID, then the group list server 140 may send the list of groups that are open to the public to the device 108 at send operation 708. When the device ID matches a device ID of a group for the current event location, then the server 140 sends the list of groups that are open to the public as well as the private groups for which the device ID matches at send operation 710. As discussed above, the list generated by the server 140 may provide an indication to the user of the device 108 of whether any of the groups have one or more active attractors for the current event location.

After having sent the list of groups available to the device 108, the server 140 then receives a signal back from the device 108 that indicates which group has been selected at reception operation 712. At this point in the example, the logical operations may follow parallel paths. The server 140 may determine whether an attractor is available for the selected group at query operation 714 by determining whether such an attractor has been sent by another device of the group. If no, then the server 140 does not respond to the device 108 since there is no attractor to provide and operational flow returns to a preceding operation to again determine whether an attractor is available for a selected group.

However, if there is an attractor active for the selected group, then the server 140 sends the active attractor to the device 108 at send operation 716. This path may itself have two parallel branches at this point. Along the first branch, after a delay the server 140 receives an updated location of the device 108 at location operation 718 and then sends an updated attractor at send operation 720. The server 140 may apply updated guidance data to the updated attractor being sent by comparing the updated location of the device 108 to the current meeting point as indicated by the current location of the device used by the initiator of the attractor. This process of receiving the updated location and then sending an updated attractor may continue until the user terminates the process or until the current location of the device 108 matches the meeting point.

The other branch leads to query operation 722 where the server 140 detects whether the device 108 has provided a response to the attractor that has been sent to it. If not, then the server 140 continues to listen for a response. Once a response is received, if any, then the server sends the response to the designated devices of the group at send operation 724. Those receiving the response may include the device of the initiator of the attractor and/or other devices of the group that have either also responded to the attractor or that have reached the meeting point.

Returning to reception operation 712, the other parallel path leads to query operation 726 where the server 140 detects whether an attractor has been received from the device 108. If not, then no further action is taken for this pathway and operational flow returns to a preceding operation to again determine whether an attractor has been received from the device 108. If the attractor is received, then the server 140 stores the attractor for responding to future selections of this group for which the attractor has been generated at storage operation 728. Then, the server 140 detects whether there has been any response to this attractor at query operation 730, presuming that the server 140 has been listening for other requests for attractors for this group per the logical operations previously discussed. If no response has been received, then the server 140 continues to listen for a response.

However, if a response is received, then the server 140 then sends the response to the device that has initiated the attractor, as well as any other devices specified by the response at send operation 732. The server 140 then continues to listen for additional responses. Accordingly, the user who has initiated the attractor via the device 108 gets an indication of whether anyone has responded to indicate that they are interested in joining the user at the current meeting point.

Thus, users of mobile communications devices who are present at large gatherings/venues/areas may find acquaintances and/or those with common interests by sending and receiving attractors via the mobile communications devices. The users may be guided to the meeting points for the groups via the sending and receiving of updated locations and guidance data. Furthermore, the groups may be open or private so that those who are attracted to the meeting point may range from anyone present at the event to only those who have previously been allowed to join the group of interest.

While embodiments have been particularly shown and described, it will be understood by those skilled in the art that various other changes in the form and details may be made therein without departing from the spirit and scope of the invention

What is claimed is:

1. A method, for attracting together individuals using a plurality of wireless communications devices, comprising:
   receiving, by a system using a processor, from a first wireless communications device of the plurality of wireless communications devices, a request to generate an attractor to be made availabe to other wireless communications devices of the plurality of wireless communications devices;
   obtaining, by the system, a first location, of the first wireless communications device;
   identifying, by the system, an event area corresponding to the first location;
   identifying, by the system, a predefined subscriber group, of multiple predefined subscriber groups, associated with the event area identified;
   generating, by the system, the attractor being for the predefined subscriber group and associated with the event area;
   obtaining, by the system, a second location, of a second wireless communications device of the plurality of wireless communications devices;
   making available, by the system, to the second wireless communications device, in response to determining that the event area includes the second location, the attractor corresponding to the predefined subscriber group and to the event area; and
   making available, by the system, to the second wireless communications device, instructions for finding a group location corresponding to the predefined subscriber group.

2. The method of claim 1, further comprising:
   receiving, from the second wireless communications device, a response to the attractor; and
   sending, to the first wireless communications device, a communication indicating the response to the attractor received from the second wireless communications device.

3. The method of claim 2, wherein the communication indicates progress in finding the group location.

4. The method of claim 1, wherein the event area corresponds to a pre-defined event held periodically at the event area.

5. The method of claim 1, wherein making available, by the system, the instructions for finding the group location comprises making available information having an indication that a group meeting point will be changed.

6. The method of claim 1, wherein making available, to the second wireless communications device, the attractor corresponding to the predefined subscriber group and to the event area comprises sending the attractor to the second wireless communications device.

7. The method of claim 1, wherein making available, to the second wireless communications device, the attractor corresponding to the predefined subscriber group and to the event area comprises permitting access to the attractor for the second wireless communications device.

8. The method of claim 1, wherein making available, to the second wireless communications device, the instructions for finding the group location comprises sending the instructions to the second wireless communications device.

9. The method of claim 8, wherein sending the instructions is performed in response to receiving a request sent by the second wireless communications device in response to receipt of the attractor at the second wireless communications device.

10. The method of claim 8, wherein sending the instructions to the second wireless communications device comprises sending the instructions as part of sending the attractor to the second wireless communications device.

11. The method of claim 1, wherein making available, to the second wireless communications device, the instructions for finding the group location comprises permitting access to the instructions for the second wireless communications device.

12. The method of claim 11, wherein making available the instructions is performed in response to receiving a request sent by the second wireless communications device in response to receipt of the attractor at the second wireless communications device.

13. The method of claim 1, wherein, in making available instructions for finding the group location, the group location is the first location.

14. The method of claim 1, wherein:
the processor of the system is in operative communication with a database; and
the event area identified is associated in the database with the predetermined subscriber group and with subscribed members of the group, including the second wireless communications device.

15. The method of claim 1, further comprising determining, by the system, that the first wireless communications device is subscribed as a member of the predetermined subscriber group.

16. The method of claim 1, wherein the generating is performed in response to determining that the first wireless communications device is a subscribed member of the predetermined subscriber group.

17. The method of claim 1, further comprising:
prompting a user of the second wireless communications device for a password defined for the predetermined subscriber group associated with the attractor generated; and
receiving the password from the second wireless communications device;
wherein making the instructions available to the second wireless communications device is performed in response to receiving the password from the second wireless communications device.

18. A computer-readable storage device comprising computer-executable instructions that, when executed by a processor, cause the processor to perform operations, for attracting together individuals using a plurality of wireless communications devices, comprising:
receiving from a first wireless communications device of the plurality of wireless communications devices, a request to generate an attractor to be made available to other wireless communications devices of the plurality of wireless communications devices;
obtaining a first location, of the first wireless communications device;
identifying an event area corresponding to the first location;
identifying a predefined subscriber group, of multiple predefined subscriber groups, associated with the event area identified;
generating the attractor being for the predefined subscriber group and associated with the event area;
obtaining a second location, of a second wireless communications device of the plurality of wireless communications devices;
making available, by the system, to the second wireless communications device, in response to determining that the event area includes the second location, the attractor corresponding to the predefined subscriber group and to the event area; and
making available to the second wireless communications device, instructions for finding a group location corresponding to the predefined subscriber group.

19. The computer-readable storage device of claim 18, wherein the operation of making available, to the second wireless communications device, the attractor corresponding to the predefined subscriber group and to the event area comprises a function selected from a group consisting of:
sending the attractor to the second wireless communications device; and
permitting access to the attractor for the second wireless communications device.

20. The computer-readable storage device of claim 18, wherein the operation of making available, to the second wireless communications device, the instructions for finding the group location comprises a function selected from a group consisting of:
sending the instructions to the second wireless communications device; and
permitting access to the instructions for the second wireless communications device.

21. A system comprising:
a processor; and
a computer-readable storage device comprising computer-executable instructions that, when executed by a processor, cause the processor to perform operations, for attracting together individuals using a plurality of wireless communications devices, comprising:
receiving from a first wireless communications device of the plurality of wireless communications devices, a request to generate an attractor to be made available to other wireless communications devices of the plurality of wireless communications devices;
obtaining a first location, of the first wireless communications device;
identifying an event area corresponding to the first location;
identifying a predefined subscriber group, of multiple predefined subscriber groups, associated with the event area identified;
generating the attractor being for the predefined subscriber group and associated with the event area;
obtaining a second location, of a second wireless communications device of the plurality of wireless communications devices;
making available, by the system, to the second wireless communications device, in response to determining that the event area includes the second location, the attractor corresponding to the predefined subscriber group and to the event area; and
making available to the second wireless communications device, instructions for finding a group location corresponding to the predefined subscriber group.

* * * * *